Dec. 22, 1964     R. E. RICHARDSON     3,162,524
GLASS BENDING MOULDS

Filed Sept. 13, 1960     4 Sheets-Sheet 1

Ronald E. Richardson
Inventor
By Cushman, Darby & Cushman
Attorneys

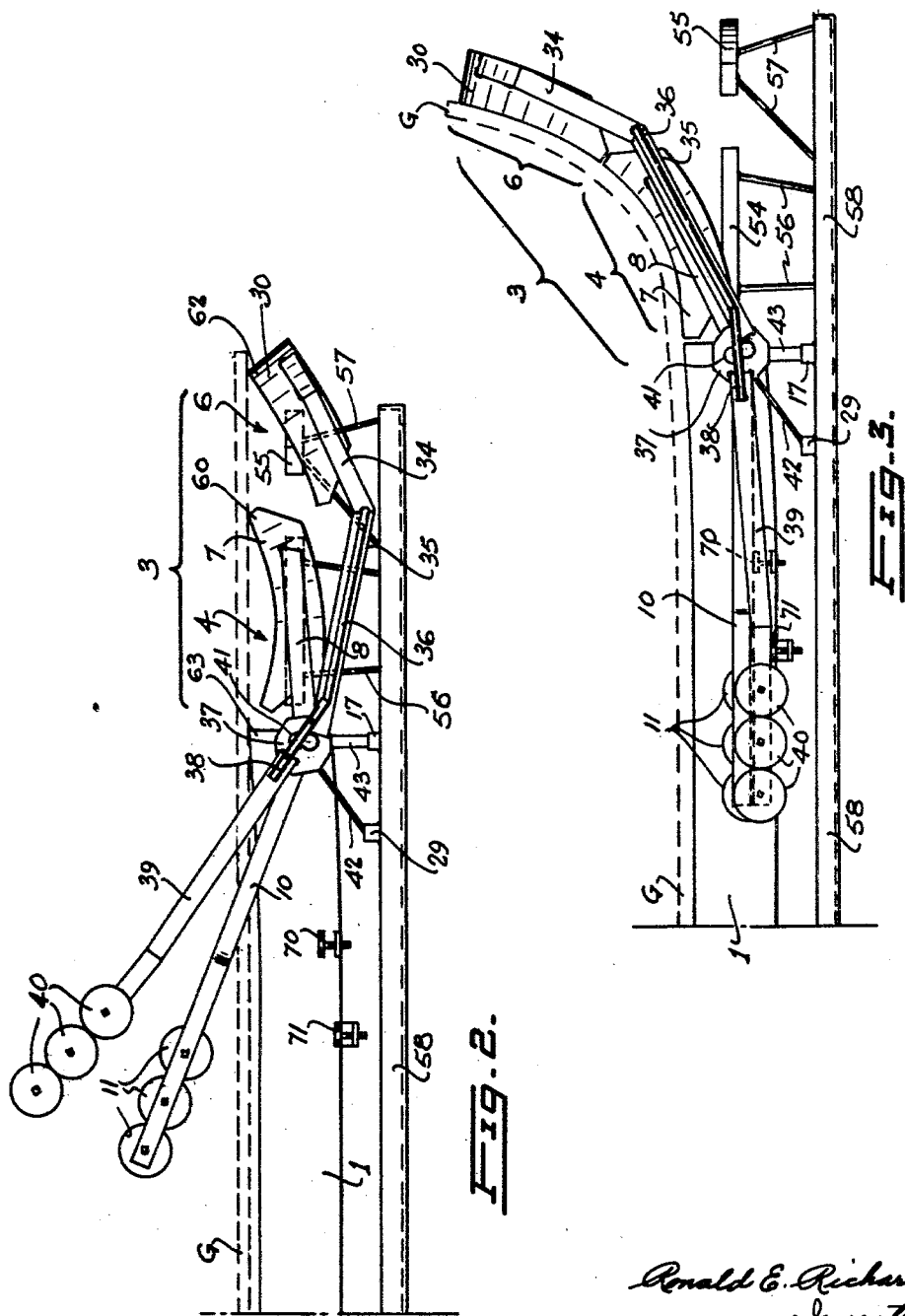

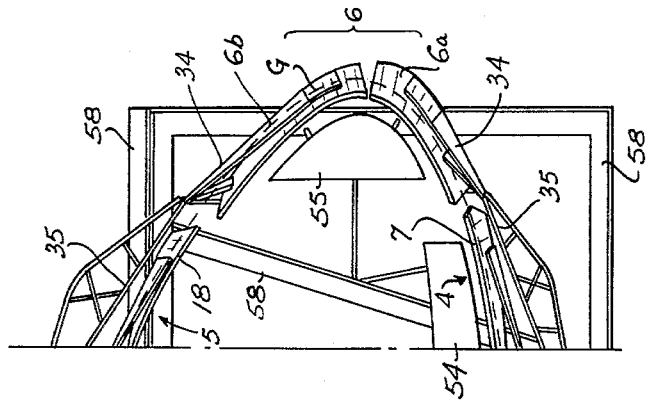
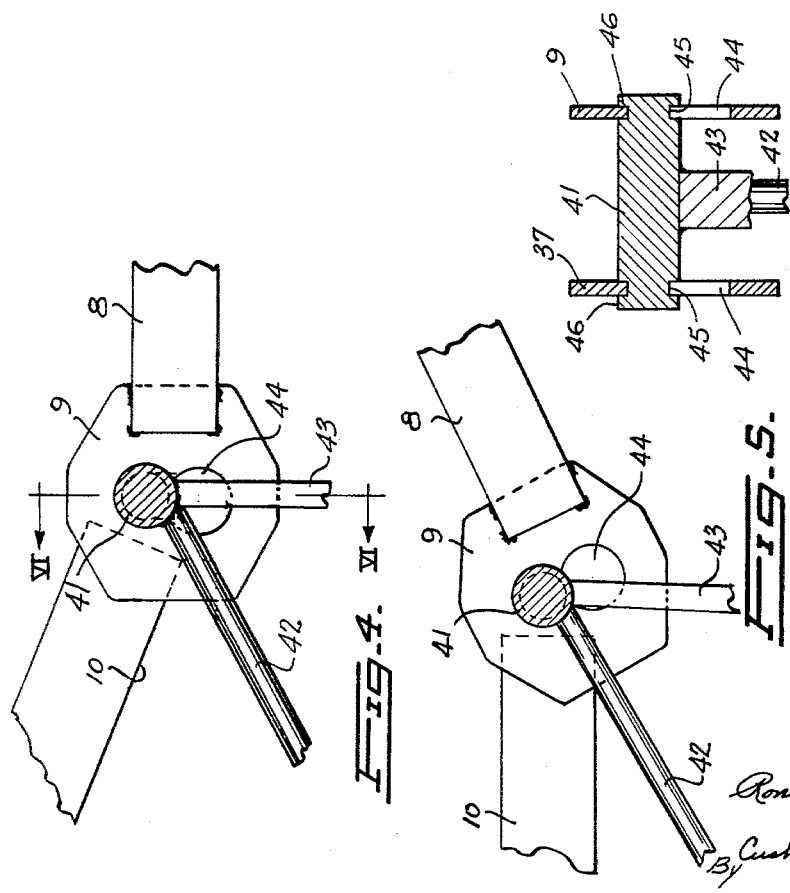

Dec. 22, 1964    R. E. RICHARDSON    3,162,524
GLASS BENDING MOULDS

Filed Sept. 13, 1960    4 Sheets-Sheet 4

Ronald E. Richardson
Inventor
By Cushman, Darby & Cushman
Attorneys

3,162,524
GLASS BENDING MOULDS
Ronald E. Richardson, Oshawa, Ontario, Canada, assignor to Pittsburgh Plate Glass Company, Pittsburgh, Pa.
Filed Sept. 13, 1960, Ser. No. 55,743
Claims priority, application Canada July 21, 1960
12 Claims. (Cl. 65—290)

This invention relates to improvements in glass bending methods and in the construction of moulds of the type that are employed in the bending of glass sheets to curved form. The continuous advance in automobile design calling for larger and more complex wrap-around windshields and rear windows, involving shorter and shorter radius bends, deeper compound bends and twisted end portions, has given rise to many problems in the construction of efficient moulds for the initial processing of the glass sheets that will ultimately be assembled to form such panels.

The principal technique employed in forming curved glass is now well developed and consists of laying a glass sheet (or a pair of superposed glass sheets—when laminated glass is being manufactured) flat on a concave, multi-part, skeleton mould which is so weighted as to tend to take up a curved condition when permitted by softening of the glass. The mould with the flat, rigid glass sheet or sheets laid thereon is passed through a lehr in which the glass is raised to a temperature sufficient to render it yieldable to the forces exerted upon it by the mould. In this manner the mould is allowed to take up its closed or curved condition and the glass is caused to conform to the curved peripheral shape defined by the mould.

It has become the practice to form skeleton moulds for this purpose with pivoted end portions each of which can either be swung into an open position, when the flat cold glass is originally placed thereon, or can move into a closed position, as the resistance to bending of the glass decreases on exposure to the high temperatures of the lehr. Weighted arms or other means are provided to act as counterweights to compensate for the weight of the movable end portions of the mould and to urge such portions into the closed position.

One object of the present invention is to provide an improved glass bending mould of this character suitable for the manufacture with improved precision and improved yields of the more complex glass shapes now being required by the automobile industry.

Another object of the invention is to provide an improved means of pivotally connecting a movable mould portion to a fixed mould portion.

Other objects and advantages of the invention will appear hereinafter.

The invention is illustrated by way of example in the accompanying drawings, wherein:

FIGURE 1 shows a plan view of the central area and one end of a concave, skeleton type mould embodying the present invention. The other end of this mould is identical (in mirror image) with the illustrated end and thus has not been shown. The mould parts are shown in their open positions.

FIGURE 2 is a side view of the mould seen in FIGURE 1.

FIGURE 3 is a further side view corresponding to FIGURE 2 but showing the mould parts in their closed positions.

FIGURE 4 is a section on the line IV—IV in FIGURE 1 on an enlarged scale.

FIGURE 5 is a view similar to that of FIGURE 4 but with the mould parts in their closed positions.

FIGURE 8 is a schematic view of a detail of FIGURE 1; and

FIGURE 9 is a fragment of FIGURE 1 showing a modification.

Figure 1:
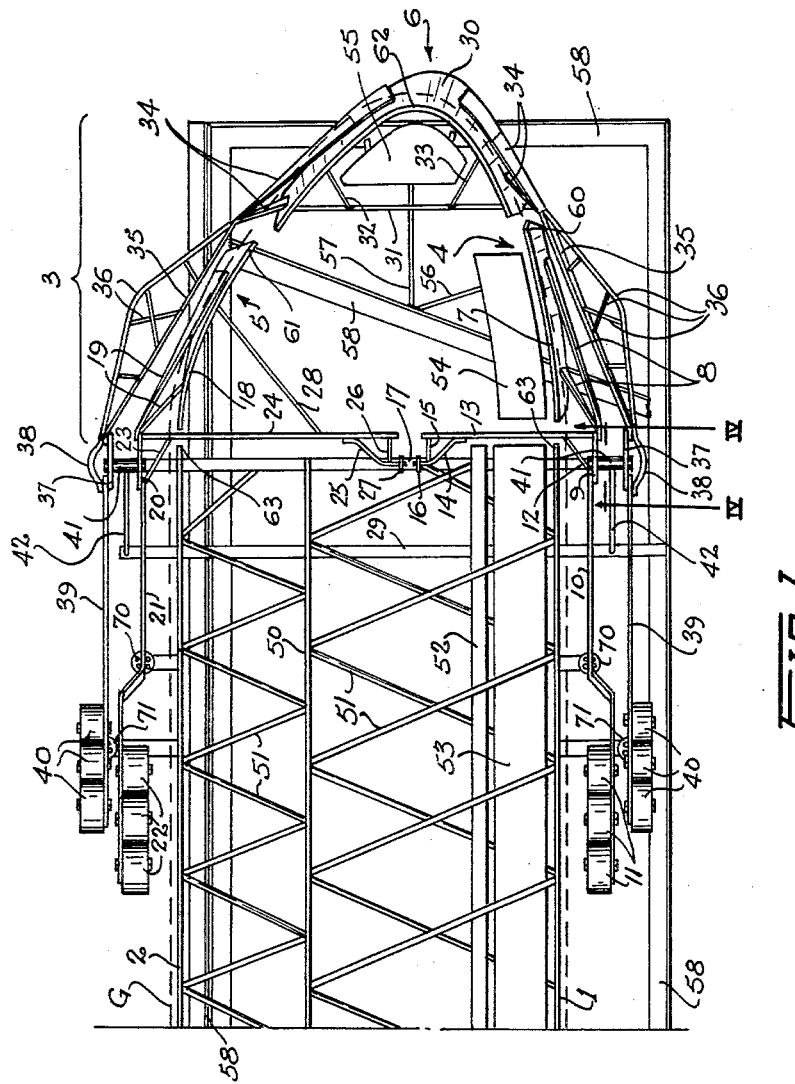

In the mould seen in FIGURES 1 to 3, vertically disposed elongated side members 1 and 2 define the edges of the main, central, stationary portion of the mould, which main portion includes the entire fixed structure of the mould. At each end of this central portion, there is an end section 3 which is itself composed of three relatively movable auxiliary mould portions 4, 5 and 6. Intermediate mould portion 4 is formed of a vertically disposed elongated glass supporting member 7, one end of which forms a substantially contiguous continuation of the side member 1 when the mould is in the closed condition (FIGURE 3). Member 7 is connected by struts 8 to a hinge plate 9 (see also FIGURES 4 and 5), to which plate there is connected a counterweight arm 10 that carries weights 11 on its inner end. A strut 12 helps to connect the hinge plate 9 rigidly to a member 13 extending inwardly from a connection to the hinge plate 9 towards the centre of the mould structure where its inner end carries a rod 14 braced by strut 15 and pivotally mounted in bearing member 16 extending upwardly from a connection to a cross-member 17 which forms part of the fixed structure of the mould.

Similarly, on the other side of the mould, intermediate mould portion 5 comprises a glass supporting member 18 connected by struts 19 to a hinge plate 20 to which plate there is connected a counterweight arm 21 on the inner end of which are mounted weights 22. A strut 23 helps to connect the hinge plate 20 rigidly to a member 24 extending inwardly from a connection to the hinge plate 20 towards the centre of the mould structure. In a manner similar to member 13 the inner end of member 24 carries a rod 25 braced to the member 24 by strut 26 and pivotally mounted in a bearing member 27 secured to fixed cross-member 17. Mould portion 5 also includes a further bracing rod 28 extending from member 24 to member 18.

End mould portion 6 is composed principally of glass supporting means in the form of bar 30 the two ends of which form substantially contiguous continuations of the members 7 and 18 when the mould is in its closed condition. The rigidity of the bar 30 is preserved by a main brace 31 and two further braces 32 and 33. On its outer sides the mould portion 6 is connected by struts 34 and 35 (the latter being further braced by trusses 36) to a hinge plate 37 on each side of the mould. Each hinge plate 37 is bridged by a rigid member 38 and has connected to it an arm 39 the inner end of which carries weights 40.

Figure 6:
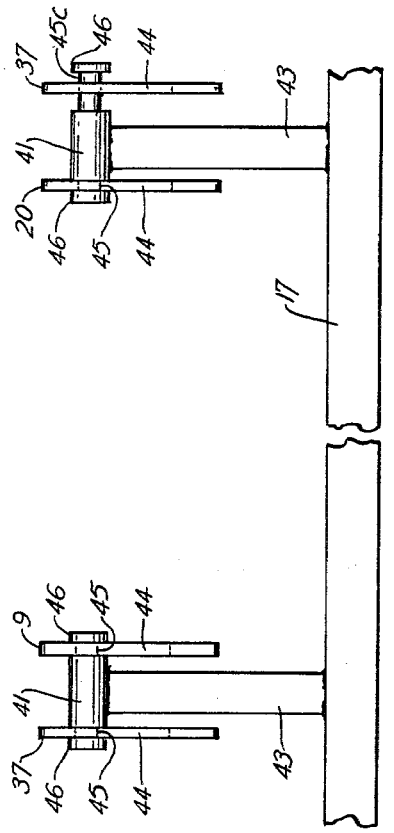
FIGURE 6 is a view taken on the line VI—VI in FIGURE 4.

As best seen from FIGURES 4, 5 and 6, hinge plates 9 and 37, on one side of the mould (and correspondingly hinge plates 20 and 37 on the other side of the mould) are mounted to pivot coaxially on a pivot pin 41 mounted to the fixed structure of the mould by bar 43 depending to cross-member 17 and rod 42 depending to further cross-member 29. Grooves 45 are formed near each end of each pivot pin 41. Each of the hinge plates is formed with a keyhole slot 44 which has a lower portion of a diameter slightly greater than the diameter of the pivot pin 41 and an upper portion of a diameter smaller than the diameter of the pivot pin 41 and slightly greater than the inner diameter of the groove 45. Each hinge plate can thus be readily engaged with the associated pivot pin 41 by passing the lower portion of the keyhole slot 44 over the pin to bring the groove 45 into alignment with the keyhole slot and then lowering the hinge plate onto the pin so that the pin enters the upper portion of the keyhole slot. The flanges 46 formed on the extreme ends of each pivot pin 41 by the grooves 45 retain the hinge plates in position and thereby prevent lateral movement of the associated mould portion 5, 6 or 7 relative to the main mould portion, while permitting the hinge plates to rotate freely about the axis defined by the pivot pin.

It will be noted that the two pins 41 on the two sides of the mould are coaxial with one another and with the pivotally supported portions of the rods 14 and 25. However this is for structural convenience and there is no reason why each of the mould portions 4, 5 and 6 should not be pivotable about a different axis.

It will be noted from FIGURE 4 that the disposition of the slot 44 in the plate 9 is such that the major axis of the slot 44 is substantially vertical when the mould portion 4 (including the strut 8) is in the open position. After bending has been completed (FIGURE 5) the major axis of the slot 44 has moved from the vertical through an angle equal to the angle through which the mould portion 4 has moved. The reason for arranging that the major axis of the slot 44 is vertical in the open position of the mould portion 4 is to minimize the possibility that the pivotal connection between the mould portion 4 and the stationary portion of the mould is impaired due to accidental displacement of the mould portion 4. Such displacement can cause the mould portion 4 and its associated hinge plate 9 to be raised upwardly thereby bringing the pivot pin 41 into the lower portion of the slot 44. If the major axis of the slot 44 is disposed at a substantial angle to the vertical when such displacement occurs, it is found that the pin 41 sometimes fails to re-enter the upper portion of the slot 44 but instead is arrested by the part of the edge of the slot lying between the upper and lower portions of the slot. Displacement of the mould portion 4 relative to the stationary portion of the mould is more likely to take place during or shortly after loading of the flat glass sheets on to the mould than while the mould is passing through the bending lehr. In other words, the danger that permanent impairment of the pivotal connection between the mould portion 4 and the stationary portion of the mould will result from accidental displacement of the mould portion 4 is greatest when the latter is in the open position. The major axis of the slot 44 is therefore made to be substantially vertical when the mould portion 4 is in the open position. The above remarks have been directed specifically to the hinge plate 9 since this is the one shown in FIGURES 4, 5 and 6 but they are applicable also to the slots in the hinge plates associated with mould members 5 and 6.

Figure 7:
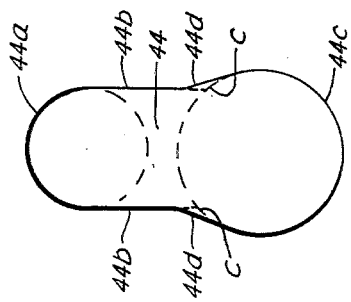
FIGURE 7 is an enlarged view of a detail of FIGURES 4 and 5.

As a further precaution against displacement of the mould portion 4 relative to the stationary portion of the mould resulting in impairment of the pivotal connection between the mould portion 4 and the fixed portion of the mould, the slot 44 shown in FIGURES 4 and 5 is provided with a contour shown on an enlarged scale in FIGURE 7. This contour includes an upper portion 44a which defines an arc of a circle of a diameter slightly greater than the inner diameter of the groove in the pin 41, parallel portions 44b separated by a distance equal to the diameter of the aforementioned circle, a lower portion 44c of generally circular outline and having an effective diameter somewhat greater than that of the pivot pin 41, and sections 44d serving to provide a smoother transition between the portions 44b and the portions 44c than would be the case if the lines defining the portions 44b were produced until they intersected the circle by means of which the lower portion 44a is essentially defined (as indicated by broken lines in FIGURE 7). If the transitional portions 44d were not provided the slot 44 would have sharp corners C which would materially increase the danger than accidental displacement of pivot pin 41 into the lower portion of the slot 44 would result in a failure of the pivot pin 41 to find its way back into the upper portions of the slot 44. Each of the slots 44 is therefore provided with a contour as shown in FIGURE 7.

It will be noted that the mould portion 6 carries two hinge plates 37 each engaging one of the pins 41. Provision has to be made to allow for the fact that upon heating the mould in a glass bending lehr the resulting thermal expansion of the elements of the mould gives rise to an increase of separation between the hinge plates 37 which is usually greater than the increase in separation between the associated grooves 45 on the pivot pins 41. This is primarily because the stationary portion of the mould is in more intimate thermal contact with the general supporting structure of the mould than the mould portion 6. This differential thermal expansion would result in the development of frictional stress at the pivotal connection if provision were not made to prevent such stress. FIGURE 8 illustrates schematically the relationship between the pivot pins 41 and the hinge plates 37 associated with the end mould portion 6. This is a view similar to that of FIGURE 6 but showing both of the pivot pins 41. It will be noted that the relationship between the plate 37, the plate 39 and the pin 41 at the left hand side of FIGURE 7 is identical with that shown in FIGURE 6. However at the right hand side of the figure, the pivot pin 41 is provided with a groove 45a having a width greater than that which is necessary in order to accommodate the edges of the slot 44 in the associated plate 37. Thus, when the mould is heated in a glass bending lehr the tendency for a greater increase in separation between the two hinge plate 37 than between the two associated grooves 45 and 45a does not give rise to frictional stress between the mould portion 6 and the stationary mould portion due to the lateral play allowed the hinge plate 37 in the groove 45a. No such precautions have to be taken in respect of the mould portions 4 and 5 since these are pivotally connected to the stationary mould portion by means of a single hinge plate 9 and 20 respectively.

The feature of arranging the hinge plates 9, 20 and 37 so that they have the major axes of the keyhole slots 44 therein substantially vertical in the open position of the associated mould portion 4, 5 or 6 and the feature of forming the keyhole slots with tapering portions joining the upper and the lower portions of the keyhole slots combine to substantially eliminate the danger that the pivotal connection between a movable mould portion and the stationary mould portion can be permanently impaired due to accidental displacement of these two mould sections relative to one another when the mould portion is in the open position. It will be appreciated that the angle through which a movable mould portion rotates relative to the stationary mould portion during the bending operation depends on the curvature which is to be imparted to the glass. Provision can be made for facilitating the fabrication of moulds to meet a range of curvatures, and hence a range of angular movements of the movable mould portions, by providing a range of plates each having the major axis of the keyhole slot 44 disposed at a slightly different angle to the vertical axis of a plate of standard shape. It should also be mentioned that in many cases the degree of angular movement of the movable mould portion during the bending operation is so great that there is some danger of permanent impairment of the pivotal connection between the movable mould portion and the stationary mould portion if accidental displacement of the movable mould portion relative to the movable stationary mould portion takes place towards the end of the bending cycle. In such cases, the ideal arrangement described above in which the major axis of the keyhole slot 44 is exactly vertical when the movable mould portion is in the open position can be modified by arranging that in the open position of the movable mould portion the major axis of the slot 44 is slightly inclined to the vertical away from the direction in which pivotal movement of the movable mould portion is to take place. This has the effect of reducing the total angle of inclination to the vertical of the major axis of the keyhole slot which takes place during the bending cycle, and therefore of minimizing the danger of permanent displacement of the movable and stationary mould portions relative to one another towards the end of the bending cycle. For this reason the words, "substantially vertical" in this specification and in the appended claims are to be construed as including cases wherein the major axis of the keyhole slot or the like aperture is inclined to the vertical by an angle not greater than 10 degrees.

The fixed structure of the mould is completed by a longitudinally extending central member 50, transverse braces 51 and ballast members 52, 53, 54 and 55 supported on rods 56 and 57 which, together with main cross-members 17 and 29 supporting the mould structure are connected to a horizontal rectangular flat bottomed framework 58 upon which the mould is transported on a roller conveyor or otherwise.

When the mould is to be used, a flat glass sheet G (or pair of sheets when glass subsequently to be laminated is being manufactured) is placed on top of the mould while the latter is held in its open condition (FIGURES 1 and 2). The weight and rigidity of the glass G will initially prevent upward movement of the mould portions 4, 5 and 6, the tips 60, 61 and 62 of the members 7, 18 and 30 respectively bearing against the underside of the glass G and being held down thereby against the forces exerted by weights 11, 22 and 40. FIGURE 2 also shows the glass G supported on tips 63 of side members 1 and 2, although this is an optional feature which is not necessarily present simultaneously with support of the glass on tips 60, 61 and 62, and will depend upon the general design of the mould. Also it is feasible to design a mould in which the glass is supported at points other than those shown in FIGURE 2; for example by the tip 72, as well as the tip 60, of the member 7.

The mould parts will remain in open condition until the glass G begins to soften as a result of the increase in temperature that it encounters on the assembly being fed on a conveyor through a heating lehr. The upward bending forces exerted by the weights 11, 22 and 40, which will more than counterbalance the weight of the end portions 4, 5 and 6 themselves, will gradually take charge and the intermediate and end portions will swing slowly upwardly, the arms 10, 21 and 39 finally coming to rest on adjustable stops 70 and 71 mounted to project outwardly from side members 1 and 2. The glass is then smoothly bent to the required shape as shown in FIGURE 3.

By virtue of the present construction in which the two intermediate mould portions 4 and 5 are entirely independent of each other and both rotate independently of the end mould portion 6, each of the tips 60, 61 and 62 will bear upwardly against the undersurface of the glass with a predetermined force which, for any given stage in the bending cycle, will be determined solely by the amount of the weight attached to its associated counterweight arm. The degree to which one side of the glass has been bent will in no way affect the steady application of a predetermined force to the other side of the glass. This enables the bending programs for the various local areas of the glass that are spaced both transversely and longitudinally from one another in the vicinity of the end of the glass sheet to be independent of one another. Consequently it permits a greater freedom of choice in selecting each bending program and a corresponding ability to bend glass sheets to shapes in which one side of the glass is substantially different in contour from the other side.

Additionally, the present construction has the advantage that the force which each glass support surface is designed to exert on its associated area of glass can never be exceeded. In the prior art type of construction in which a movable glass supporting surface on one side of the mould is connected to move synchronously with a corresponding glass supporting surface on the opposite side of the mould, these glass supporting surfaces will not necessarily bear with the desired force on their respective glass areas. Whenever there is such an unbalance, one of the mould-to-glass contacts will be transmitting a force in excess of that desired, which may have a deleterious effect on the bending program and on the finished product. In the present construction, an unbalance of forces is possible, but this can only occur in a controlled manner as the result of a deliberate choice of loading of respective counterweight arms. This ability to set up any desired unbalance of glass loading, combined with the prevention of uncontrolled and undesired fluctuations in the glass loading, represents the principal advantage of the invention over prior mould constructions.

FIGURE 9 shows an alternative construction in which the end portion 6 is divided into two parts 6a and 6b each connected as before by struts 34 and 35 to weighted arms, but, in the present instance, each free to rotate independently of the other. The provision of the wide groove 45a shown in FIGURE 8 becomes unnecessary since the hinge plates 37 are no longer interconnected by a unitary end portion 6 but otherwise the same general arrangements as shown in FIGURES 1 to 8 are maintained. This modified construction thus has four separate, independently pivotable, auxiliary mould portions, two end portions and two intermediate portions. The same advantages accrue to this construction as discussed above in connection with the construction of FIGURES 1 to 8, with the further flexibility afforded by having four instead of three independent mould surfaces supporting and pushing upwardly on the glass.

As indicated, the modification of FIGURE 9 will normally be combined with the features of FIGURES 1 to 8, but it is possible to construct a mould in which, while two end mould portions take the place of a single end mould portion, the intermediate portions are connected together (as by making members 13 and 24 a common member) to act as a single mould portion having glass supporting surfaces on both sides of the mould. This combination of parts will reduce the independently pivotable auxiliary portions at each end of the mould from four back to three, and, as a result, in most instances will have less desirability than the four portion construction of FIGURE 9, or the three portion type of construction illustrated in FIGURES 1 to 8, but will nevertheless have advantages over prior art types of mould and will have utility in bending glass in which the shape of the extreme tips is especially critical.

It will be realized that mounting of a movable mould portion for pivotal movement relative to a stationary mould portion by the interengagement of a slotted member and a grooved pivot pin as described above is applicable to moulds other than those provided with subdivided end sections which are described in the present application. In fact, a pivotal connection of the kind described is applicable generally to glass bending moulds which have a stationary mould portion and a movable mould portion pivotable relative to said stationary mould portion. Nor is it necessary that the grooved pivot pin be attached to the fixed mould portion and the slotted member attached to the movable mould portion as described above. On the contrary, useful bending moulds have been constructed in which the pivot pins have been carried by movable end mould portions and the slotted hinge plates have been carried by the fixed structure of the mould. The keyhole slot is then arranged with the portion of greatest diameter uppermost instead of lowermost as described above. This construction has the decided advantage that the major axis of the keyhole slot can be maintained substantially vertical not only in the open position of the mould but also during the whole of the bending cycle since the hinge plate does not move during the bending cycle. However, when the slotted hinge plate is carried by the fixed structure of the mould it is usually in a slightly more elevated position than it would be if it was attached to the movable end mould portion. This elevation of the slotted hinge plate tends to result in additional edge shadowing of the glass, thereby causing at least some uneven heating and sometimes breakage of the glass. Consequently, it is normally best to attach the slotted hinge plates to the movable mould portions.

I claim:

1. A concave glass bending mould of the multi-part skeleton type movable between an open position for receiving a sheet of flat glass thereon and a closed position peripherally defining a curved contour to which the glass is to conform after bending, said mould including a main mould portion comprising a pair of laterally spaced, generally parallel, continuous, elongated glass supporting side members, and an end mould section comprising at least two continuous, elongated, auxiliary mould portions situated longitudinally outboard of an end of said elongated glass supporting members, each auxiliary mould portion, comprising an elongated glass supporting member having a continuous upper surface defining a continuous portion of the curved contour, said auxiliary mould portions being adapted to co-operate with each other in the closed condition of the mould to form a substantially continuous glass supporting surface extending between an end of a first side member of said pair and the corresponding end of a second side member of said pair, means pivotally mounting each of said auxiliary mould portions for movement relative to said main mould portion between open and closed position independently of the movement of the remainder of said auxiliary mould portions, and means connected to each auxiliary mould portion for urging each of the latter to its closed position.

2. A concave glass bending mould of the multi-part skeleton type movable between an open condition for receiving a sheet of flat glass thereon and a closed condition peripherally defining a curved contour to which the glass is to conform after bending, said mould including a main mould portion comprising a pair of elongated glass supporting side members, an end mould portion comprising elongated glass supporting means, means pivotally mounting said end mould portion on said main mould portion to be movable between open and closed positions, means connected to said end mould portion for urging the latter to its closed position, a first intermediate mould portion comprising an elongated glass supporting member situated at one side of the mould to extend between an end of a first side member of the main mould portion and one end of said glass supporting means of the end mould portion to form a substantially continuous glass supporting surface therewith in the closed condition of the mould, means pivotally mounting said first intermediate mould portion on said main mould portion for movement between open and closed positions independently of the movement of said end mould portion, means connected to said first intermediate portion for urging the latter to its closed position, a second intermediate mould portion comprising an elongated glass supporting member situated on the side of the mould opposite said first intermediate mould portion to extend between an end of the second side member of the main mould portion and the other end of said glass supporting means of the end mould portion to form a substantially continuous glass supporting surface therewith in the closed condition of the mould, means pivotally mounting said second intermediate mould portion on said main mould portion for movement between open and closed position independently both of the movement of said end mould portion and of the movement of said first intermediate mould portion, and means connected to said second intermediate mould portion for urging the latter to its closed position.

3. A concave glass bending mould of the multi-part skeleton type movable between an open condition for receiving a sheet of flat glass thereon and a closed condition peripherally defining a curved contour to which the glass is to conform after bending, said mould including a main mould portion comprising a pair of elongated glass supporting side members, a first end mould portion comprising an elongated glass supporting member, means pivotally mounting said first end mould portion for movement between open and closed positions, means connected to said first end mould portion for urging the latter to its closed position, a second end mould portion comprising an elongated glass supporting member one end of which forms a substantially continuous glass supporting surface with one end of the glass supporting member of the first end mould portion in the closed condition of the mould, means pivotally mounting said second end mould portion for movement between open and closed positions independently of the movement of said first end mould portion, means connected to said second end mould portion for urging the latter to its closed position, a first intermediate mould portion comprising an elongated glass supporting member situated at one side of the mould to extend between an end of a first side member of the main mould portion and the other end of the glass supporting member of the first end mould portion to form a substantially continuous glass supporting surface therewith in the closed condition of the mould, means pivotally mounting said first intermediate mould portion on said main mould portion for movement between open and closed position independently of the movement of both said end mould portions, means connected to said first intermediate portion for urging the latter to its closed position, a second intermediate mould portion comprising an elongated glass supporting member situated on the side of the mould opposite said first intermediate mould portion to extend between an end of the second side member of the main mould portion and the other end of the glass supporting member of the second end mould portion to form a substantially continuous glass supporting surface therewith in the closed condition of the mould, means pivotally mounting said second intermediate mould portion on said main mould portion for movement between open and closed positions independent of the movement of both said end mould portions, and means connected to said second intermediate mould portion for urging the latter to its closed position.

4. A mould as claimed in claim 3 wherein said intermediate mould portions are pivotally mounted independently of each other.

5. A glass bending mould comprising a stationary mould portion and at least one movable mould portion pivotally connected with said stationary mould portion for movement between an open and a closed position by interengagement of pin means secured to one of said mould portions with an apertured member secured to the other of said mould portions, said apertured member having an elongated aperture, the major axis of said aperture being substantially vertical when the movable mould portion is in the open position, said pin means having an annular groove therein of a width slightly greater than the thickness of said apertured member, said aperture having a first portion with an edge defining an arc of a circle of a diameter slightly greater than the inner diameter of said groove but less than the diameter of said pin means and a second portion of such dimensions as to allow passage of said pin therethrough, and said annular groove being interengaged with said first portion of said slot.

6. A glass bending mould comprising a stationary mould portion and at least one movable mould portion pivotally connected with said stationary mould portion for movement between an open and a closed position by interengagement of pins means secured to one of said mould portions and an apertured member secured to other of said mould portions, said apertured member having an elongated aperture the major axis of said aperture being substantially vertical when the movable mould portion is in the open position, said pin means having an annular groove therein of a width slightly greater than the width of said apertured member, said aperture having an upper portion the uppermost edge of which defines an arc of a circle of a diameter slightly greater than the inner diameter of said groove but less than the diameter of said pin means, a lower portion of a diameter greater than the diameter of said pin, and an intermediate portion having substantially parallel upper edges spaced apart by a distance substantially equal to the diameter of said circle and lower edges inclined to the major axis of said aperture to provide a gradual transition between the edges of said intermediate and lower portions, said annular groove being interengaged with said upper portion of said slot.

7. A glass bending mould comprising a stationary mould portion and at least one movable mould portion pivotally connected with said stationary mould portion for movement between an open position and a closed position, pin means secured to said stationary mould portion, a plate secured to said movable mould portion having a slot therein, said pin means having an annular groove therein of a width slightly greater than the thickness of said plate, said slot having an upper portion the uppermost edge of which defines an arc of a circle of a diameter slightly greater than the inner diameter of said groove but less than the diameter of said pin means and a lower portion of a diameter greater than the diameter of said pin, said plate being secured to said movable mould portion in such manner that the major axis of said slot is substantially vertical when said movable mould portion is in the open position, said annular groove being interengaged with said upper portion of said slot.

8. A glass bending mould comprising a stationary mould portion and at least one movable mould portion pivotally connected with said stationary mould portion for movement between an open position and a closed position, a plate secured to said movable mould portion having a slot therein, pin means secured to said stationary mould portion, said pin means having an annular groove therein of a width slightly greater than the thickness of said plate, said slot having an upper portion the uppermost edge of which defines an arc of a circle of a diameter slightly greater than the inner diameter of said groove but less than the diameter of said pin means, a lower portion of a diameter greater than the diameter of said pin, and an intermediate portion having substantially parallel upper edges spaced apart by a distance substantially equal to the diameter of said circle, and lower edges inclined to the major axis of said slot to provide a gradual transition between the substantially parallel edges of said intermediate portions and the edges of said lower portion, said annular groove being interengaged with said upper portion of said slot.

9. A glass bending mould comprising a stationary mould portion and a movable mould portion pivotally connected with said stationary mould portion for movement between an open position and a closed position by interengagement of a first pin means secured to a first side of one of said mould portions with an apertured member secured to a first side of the other mould portion and by interengagement of a second pin means secured to a second side of said mould portion to which said first pin means is secured with a second apertured member secured to a second side of said mould portion to which said first apertured member is secured, each of said apertured members having an elongated aperture, the major axis of each of said apertures being substantially vertical when the movable mould portion is in the open position, each of said pin means having an annular groove therein, each of said apertures having a first portion with an edge defining an arc of a circle of a diameter slightly greater than the inner diameter of the groove in the corresponding pin means but less than the diameter of the corresponding pin means and a second portion of a diameter greater than the diameter of the corresponding pin means, the annular groove in said first pin means being interengaged with said first portion of the aperture in said first apertured member and the annular groove in said second pin means being interengaged with the first portion of the aperture in said second apertured member, the width of the groove in said first pin means being slightly greater than the thickness of said first apertured member and the width of the groove in said second pin means being considerably greater than the thickness of said second apertured member whereby said second apertured member has a degree of lateral movement relative to said second pin means sufficient to avoid the creation of increased frictional stress in the pivotal connection between said stationary mould portion and said movable mould portion when the mould is heated.

10. A glass bending mould as claimed in claim 9 wherein each of said pin means is secured to said stationary mould portion and each of said apertured members is secured to said movable mould portion.

11. A glass bending mould according to claim 6 wherein each of said apertures has an upper portion the uppermost edge of which defines an arc of a circle of a diameter slightly greater than the inner diameter of the groove in the corresponding pin means but less than the diameter of the corresponding pin means, a lower portion of a diameter greater than the diameter of the corresponding pin means, and an intermediate portion having substantially parallel upper edges spaced apart by a distance substantially equal to the diameter of said circle and lower edges inclined to the major axis of said aperture to provide a gradual transition between the substantially parallel edges of said intermediate portion and the edges of said lower portion.

12. A concave glass bending mould of the multi-part skeleton type movable between an open position for receiving a sheet of flat glass thereon and a closed position peripherally defining a curved contour to which the glass is to conform after bending, said mould including a main mould portion comprising a pair of laterally spaced, generally parallel, continuous, elongated glass supporting side members, and an end mould portion comprising at least two continuous, elongated, auxiliary mould portions situated longitudinally outboard of an end of said elongated glass supporting members, each auxiliary mould portion comprising an elongated glass supporting member having a continuous upper surface defining a continuous portion of the curved contour, said auxiliary mould portions being adapted to co-operate with each other in the closed condition of the mould to form a substantially continuous glass supporting surface extending between an end of a first side member of said pair and the corresponding end of a second side member of said pair, and means connected to each auxiliary mould portion for urging each of the latter to its closed position, each of said auxiliary mould portions being pivotally mounted for movement relative to said main mould portion between open and closed position independently of the movement of the remainder of said auxiliary mould portions by interengagement of pin means secured to said main mould portion with an apertured member secured to said auxiliary mould portion, said apertured member having an elongated aperture, the major axis of said aperture being substantially vertical when the auxiliary mould portion is in the open position, said pin means having an annular groove therein of a width slightly greater than the thickness of said apertured member, said aperture having a first portion with an edge defining an arc of a circle of a diameter slightly greater than the inner diameter of said groove but less than the diameter of said pin means and a second portion of a diameter greater than the diameter of said pin, and said annular groove being interengaged with said first portion of said slot.

References Cited in the file of this patent

UNITED STATES PATENTS

| | | |
|---|---|---|
| 2,737,758 | Jendrisak | Mar. 13, 1956 |
| 2,856,734 | Richardson | Oct. 21, 1958 |
| 2,901,866 | McKelvey et al. | Sept. 1, 1959 |

FOREIGN PATENTS

| | | |
|---|---|---|
| 763,698 | Great Britain | Dec. 12, 1956 |
| 1,089,973 | France | Oct. 13, 1954 |
| 1,218,679 | France | Dec. 21, 1959 |